United States Patent [19]

Holoubek et al.

[11] 4,008,401

[45] Feb. 15, 1977

[54] U. V. CURING SYSTEM

[75] Inventors: George H. Holoubek; Henry A. Burzlaff, both of Muscatine, Iowa

[73] Assignee: Dart Industries Inc., Los Angeles, Calif.

[22] Filed: Oct. 1, 1975

[21] Appl. No.: 618,702

[52] U.S. Cl. .............................................. 250/453

[51] Int. Cl.$^2$ ........................................ G01M 21/00

[58] Field of Search ........... 250/453, 454, 456, 455

[56] References Cited

UNITED STATES PATENTS

| | | | |
|---|---|---|---|
| 2,192,348 | 3/1940 | James | 250/454 |
| 3,452,195 | 6/1969 | Brunner | 250/453 |
| 3,530,294 | 9/1970 | Rogers | 250/453 |
| 3,664,188 | 5/1972 | Kockott | 250/453 |
| 3,894,237 | 7/1975 | Choate et al. | 250/453 |

*Primary Examiner*—Alfred E. Smith
*Assistant Examiner*—B. C. Anderson
*Attorney, Agent, or Firm*—Kenneth J. Hovet

[57] ABSTRACT

A system for successively curing resinous printing or coatings about the exterior of tubular articles with ultraviolet radiation. A housing is provided having inlet and outlet openings for an endless chain having transversely extending stationary pins. The chain is directed by guide rollers over a sprocket wheel located concentric with an elongated ultraviolet lamp. The axis of the lamp and pins extend parallel to each other so that when the tubular articles are placed on the pins and conveyed around the wheel, a major portion of all the U.V. radiation emitted is utilized for curing and all surfaces of the tube exterior are exposed. The efficiency of the system is further enhanced with the use of a radiation reflector shield positioned radially outward from the sprocket wheel. The system includes a cooling means to remove heat from the housing generated by the ultraviolet lamp.

9 Claims, 7 Drawing Figures

U. V. CURING SYSTEM

BACKGROUND OF THE INVENTION

1. FIELD OF THE INVENTION

The present invention relates to the ultraviolet radiation curing of resin films and, more particularly, to a system for curing photosensitive resins on a tubular article with ultraviolet light.

2. DESCRIPTION OF THE PRIOR ART

Numerous systems have been devised for sterilizing containers used for foodstuffs, pharmacy items or the like. These systems commonly include a conveyor system operating in conjunction with one or more ultraviolet radiation sources and a reflector shield positioned to expose all surfaces to the concentrated ultraviolet source. Exemplary of such systems is an apparatus for sterilizing the interior of milk cartons described in U.S. Pat. No. 1,984,457. A system for sterilizing combs utilizing a central ultraviolet radiation source and an outer reflector shield is shown in U.S. Pat. No. 2,424,036.

With the discovery of photosensitive catalysts or modifiers usable with resinous materials, the ultraviolet radiation systems were modified to treat the light-sensitive resins for effecting a cure thereof. Ultraviolet light sources used for such resin curing devices commonly directed the ultraviolet radiation onto a narrow band of surface with the radiation concentrated into a limited area of application.

To effect the curing of large surface areas, banks of ultraviolet lamps were used within an enclosed chamber. The resin-coated materials were passed beneath the lamps for a specified period of time to effect the cure of the resin. Such an assembly is shown in U.S. Pat. No. 3,790,801.

Although still somewhat cumbersome, these systems were a substantial improvement over the previous heat curing systems commonly used for curing resinous materials. This is especially true for the resinous printing inks and coatings used on tubular articles. In such a system, large ovens and complicated conveyor systems were required for transporting the coated tubular articles through the ovens at a prescribed high temperature for a specified period of time. Such ovens require substantial amounts of fuel to operate and take up much space on an assembly line. Further, they require a large amount of maintenance to maintain in good working order.

SUMMARY OF THE INVENTION

A compact system is provided for continuously curing resin coated tubular articles. The system includes a housing enclosing an elongated ultraviolet radiation source. A transportation means conveys the tubular articles into the housing and about a rotation means located concentric with the elongated radiation source. The tubular articles are thereby exposed to the radiation source a predetermined distance from the radiation source.

The system includes means for mounting the tubular articles on the transportation conveyor in a stationary manner such that as the tubes travel in a curved pathway about the radiation source, the entire tubular article exterior is exposed to the direct radiation. To further enhance the efficiency of the system, a reflector means is provided radially outward from the path of revolution of the tubular articles. In this manner the exterior surfaces are exposed to both direct radiation and indirect reflected radiation. This effects a fast and complete curing of the exteriorly coated tubular articles without requiring large expenditures of heating fuel, maintenance costs or valuable production space.

The system includes an ancillary cooling means to remove heat generated by the radiation source. This means includes a cooling air system mounted on the housing including inlet and outlet ducts for the ingress and egress of the cooling air. Additionally, a tubular-shaped heat exchanger is optionally included about the elongated radiation source. Of course, the heat exchanger will be transparent to the ultraviolet radiation.

DESCRIPTION OF THE PREFERRED EMBODIMENT

Figure 1:
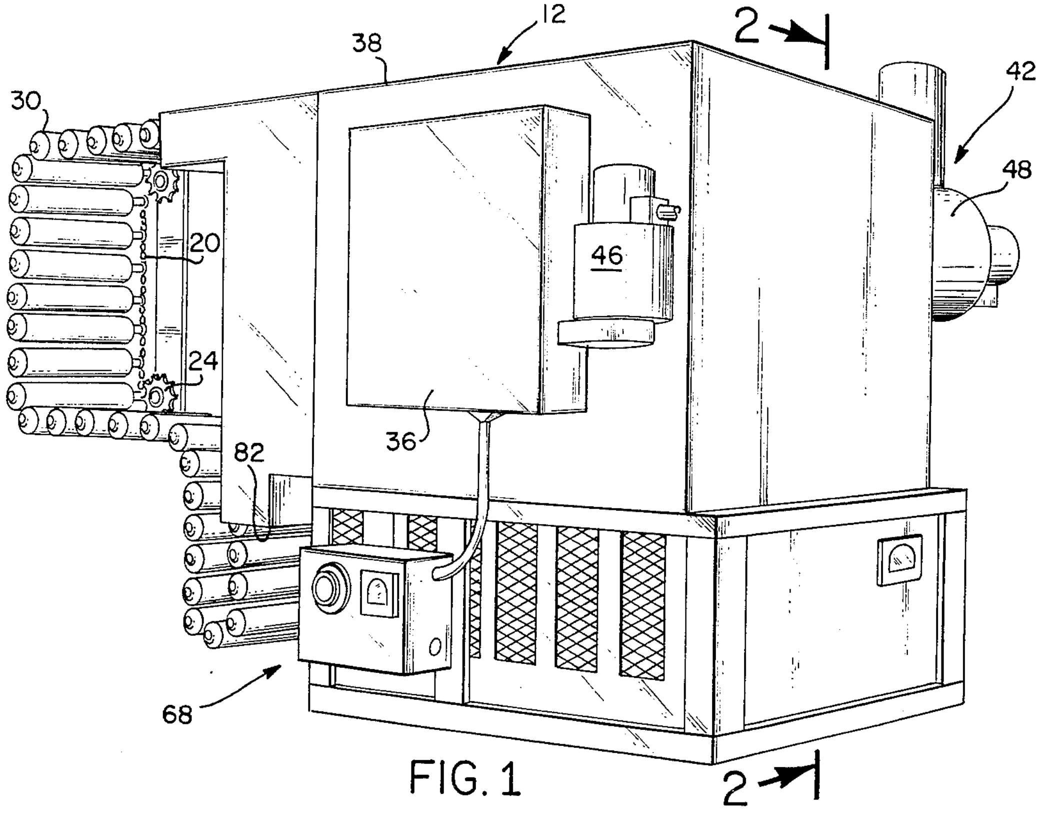
FIG. 1 is a perspective view of the overall resin curing system of the present invention.
Figure 2:
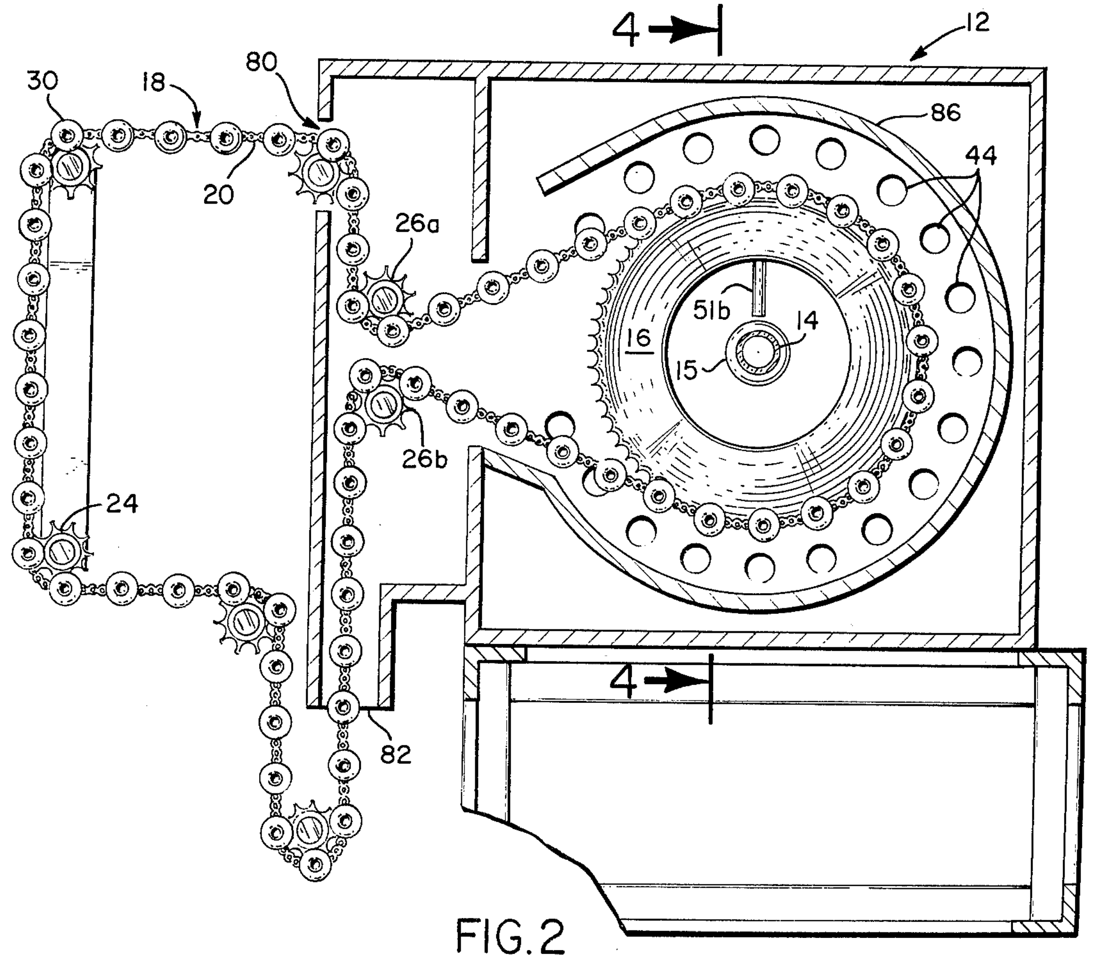
FIG. 2 is a fragmentary cross-section view taken along lines 2—2 of FIG. 1.

Referring now to the drawings and, more particularly to FIGS. 1–4 thereof, the basic elements of the invention are shown. Reference numeral 12 is directed toward the housing which encloses an elongated radiation source 14. A particularly suitable radiation source for purposes of the present invention is a Hanovia mercury arc high intensity, medium pressure ultraviolet lamp operating at about 200 watts per inch. This lamp has a nominal 12 inch effective length and is supported at the ends with porcelain sockets 15,17. The lamp is connected to an energy source shown generally by reference numeral 68 with electrical conductors 70.

Located concentric with the radiation source is rotation means 16 about which travels transportation means shown generally by reference numeral 18. The transportation means includes an endless conveyor 20 comprising, in the particular embodiment shown, an endless chain having a plurality of transversely extending, stationary mounting means shown as pins 22. The endless chain if guided by guide rollers 24 including housing guide rollers 26*a,b*. Housing rollers 26*a,b* operate to direct the chain over rotation means 16 shown in the preferred embodiment as a sprocket wheel. The rollers are positioned in lateral alignment with the sprocket wheel and are spaced apart a distance less than the diameter of the wheel. In this manner the chain 20 will travel about a major portion of said wheel and define a curved pathway which, in the preferred embodiment is oval shaped.

It will be understood that tubular articles 30 are merely inserted upon the pins 22 such that they hang freely by gravity. Since the pins do not rotate, the tubular articles will remain stationary. In this manner, as the tubes 30 revolve somewhat less than 360° about the radiation source, all of the exterior surfaces will receive direct radiation. It will also be appreciated that the tubular articles and pins extend parallel and coextensive with the axis of the elongated ultraviolet lamp.

The system of the present invention is equipped with a cooling means including an ancillary plenum chamber 36 overlying sidewall 38 of the housing. Enclosed within the plenum chamber 36 and extending through the sidewall 38 are air ingress orifices 40. The ingress orifices are located in a somewhat circular configuration radially outward from the periphery of the sprocket wheel 16. The cooling means includes a vent means 42 which operates to draw hot air from the housing through egress orifices 44 out to the atmosphere. The exiting air passes through the egress orifices in sidewall 39 of housing 12. The orifices 44 are arranged in a circular pattern radially outward from the sprocket 16 in a manner similar to orifices 40.

Figure 5:
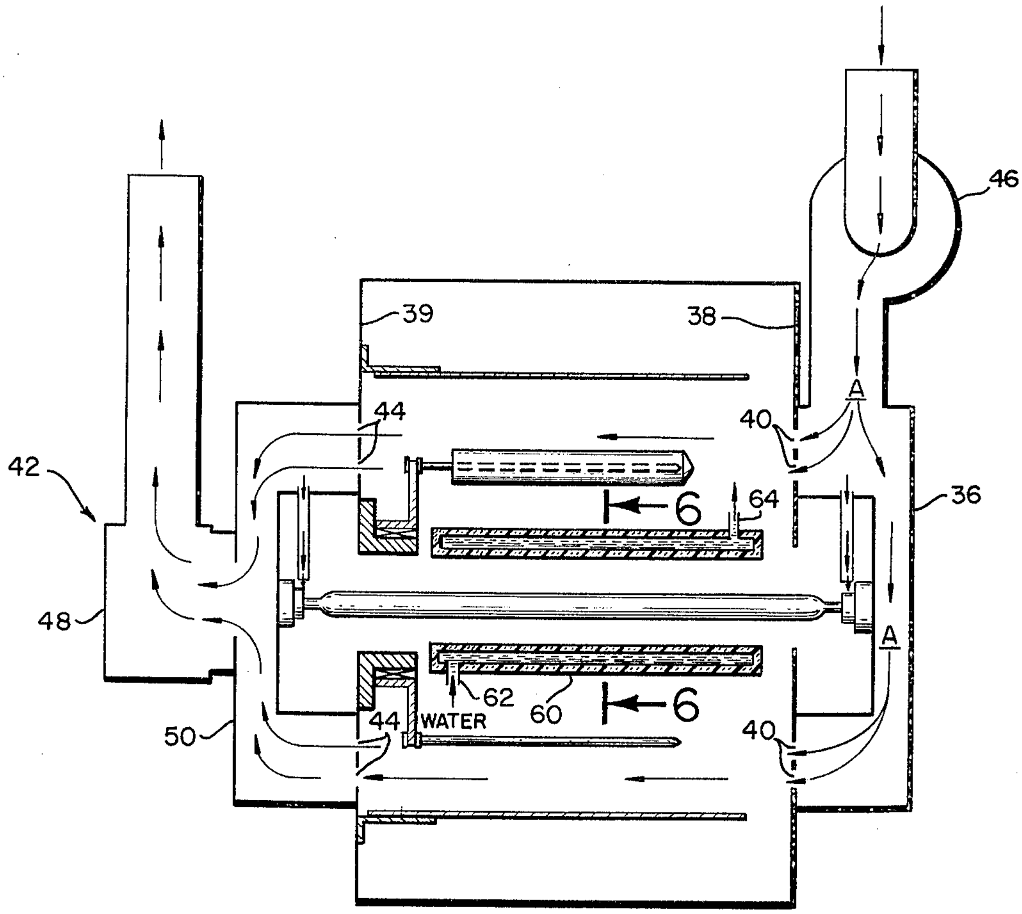
FIG. 5 is a schematic elevation view of the housing interior showing the operation of the system cooling means.

In FIG. 5 the air flow patterns are shown by direction arrows A. The motive force for the air flow is by fan 46 operating in conjunction with vent fan 48. The vent fan also operates in conjunction with an outlet plenum chamber 50 also located on the opposing housing sidewall 39. To guard against overheating of the insulative U.V. lamp sockets 15,17 and possible damage to the lamp end seals, cooling means optionally includes air jets 51*a,b*. The jets are simply tubes extending into the housing directing cooling air from a compressor source (not shown) to the localized area about each socket.

Figure 6:
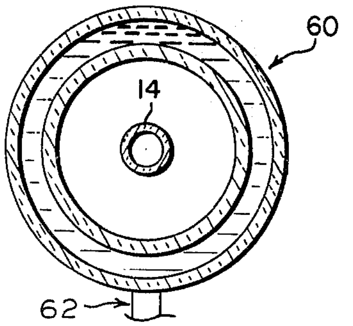
FIG. 6 is an elevation section view taken along lines 6—6 of FIG. 5.
Figure 7:
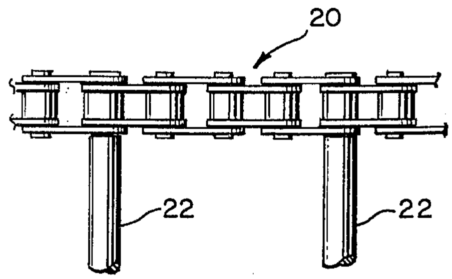
FIG. 7 is an enlarged fragmentary view of the endless conveyor and mounting pins of the present invention.

As shown in FIGS. 5 and 6, the curing system cooling means preferably includes a double-walled tubular heat exchanger 60 encompassing all or a substantial portion of the longitudinal extent of the U.V. lamp 14. The heat exchanger includes an inlet 62 and an outlet 64 for passing a cooling medium therethrough. Typically water is utilized as the cooling medium and the heat exchanger sidewalls are constructed of quartz since both are transparent to the ultraviolet radiation.

It will be appreciated that with the arrangement of the present invention, radiation emitted along the entire length of the lamp and 360° about its circumference is effectively utilized. About 40 percent of the emission from the aforementioned Hanovia lamp is in the ultraviolet range. This radiation impinges upon photosensitive resins applied to the tubular articles 30 as a printing ink and/or overcoating material. The ultraviolet radiation operating in conjunction with the resin photosensitizer initiates the production of a free radical in the resin with the subsequent polymerization thereof. The housing 12 with its restricted inlet opening 80 and outlet opening 82 provides an enclosed environment in which the polymerization can take place at a suitable temperature and with the utmost in providing an efficient use of the lamp. Note that the centrally located radiation source operating in conjunction with the concentric sprocket wheel and transportation means cause the tubes to revolve through a substantially closed curve pathway for substantially complete resin polymerization without heat damage or radiation damage.

To further enhance the rapid and efficient curing of the resinous printing or coating on the exterior of the tubes, it is preferable to provide a reflecting shield 86. The reflector shield is located radially outward from the path of the tubes and is positioned concentric with the radiation source and tube pathway. This allows for the U.V. radiation to be reflected back toward the tubes as they revolve about lamp 14. Of course, this subjects the tubes to both direct and indirect radiation. Note that to facilitate the operation of the cooling means, the reflector shield is desirably located radially outward from cooling air orifices 40. In this manner cooling air is better directed toward the tubes 30.

In describing the operation of the present invention it is contemplated that the tubes will have a resinous printing ink and/or overcoating imparted upon their external surfaces and will have been inserted on the pins 22 for the subsequent curing operation. By way of example only, commonly used resins may be acrylics used alone or in combination with melamine, urea, urethane, polyester or epoxide compositions. It is preferable that the resin be 100 percent reactive so that there will be no solvents released during curing. The resins must contain a small amount of photosensitizer. Commonly used photosensitizers may be, for example, derivatives of benzoin.

Figure 3:
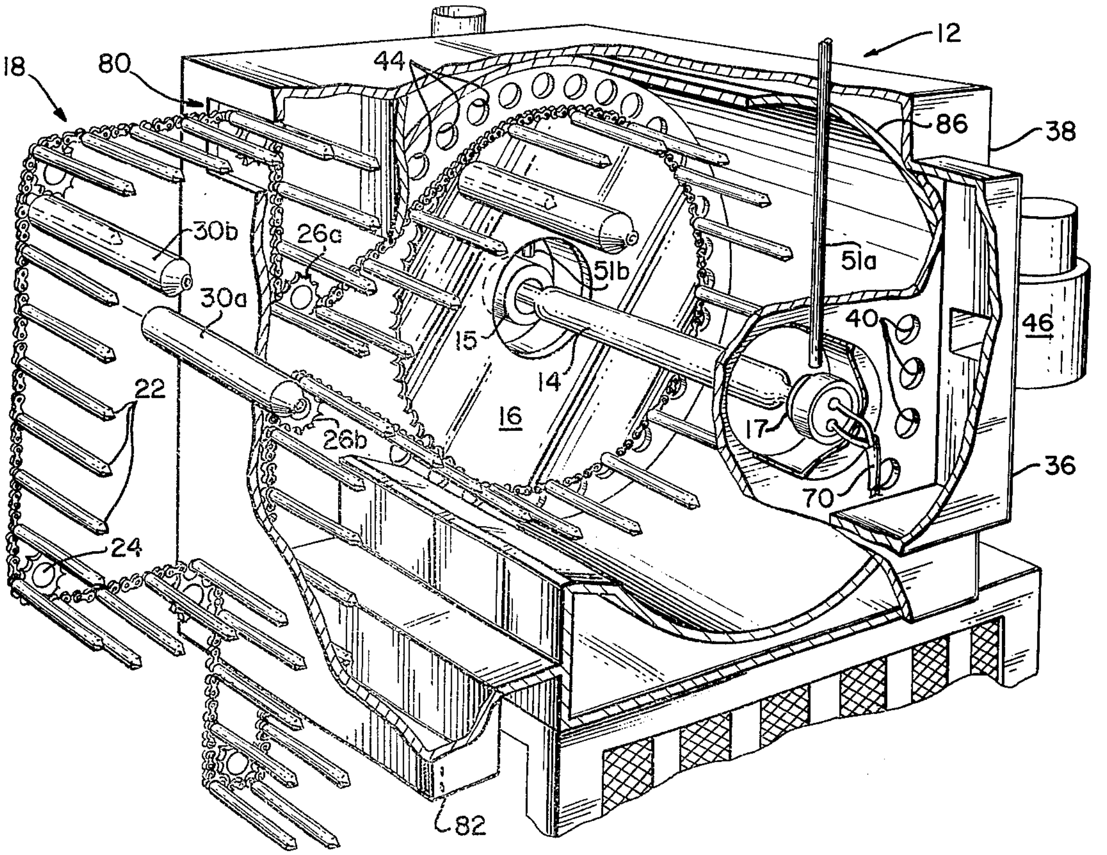
FIG. 3 is a perspective fragmentary partially sectioned view of the interior of the curing system shown in FIG. 1.
Figure 4:
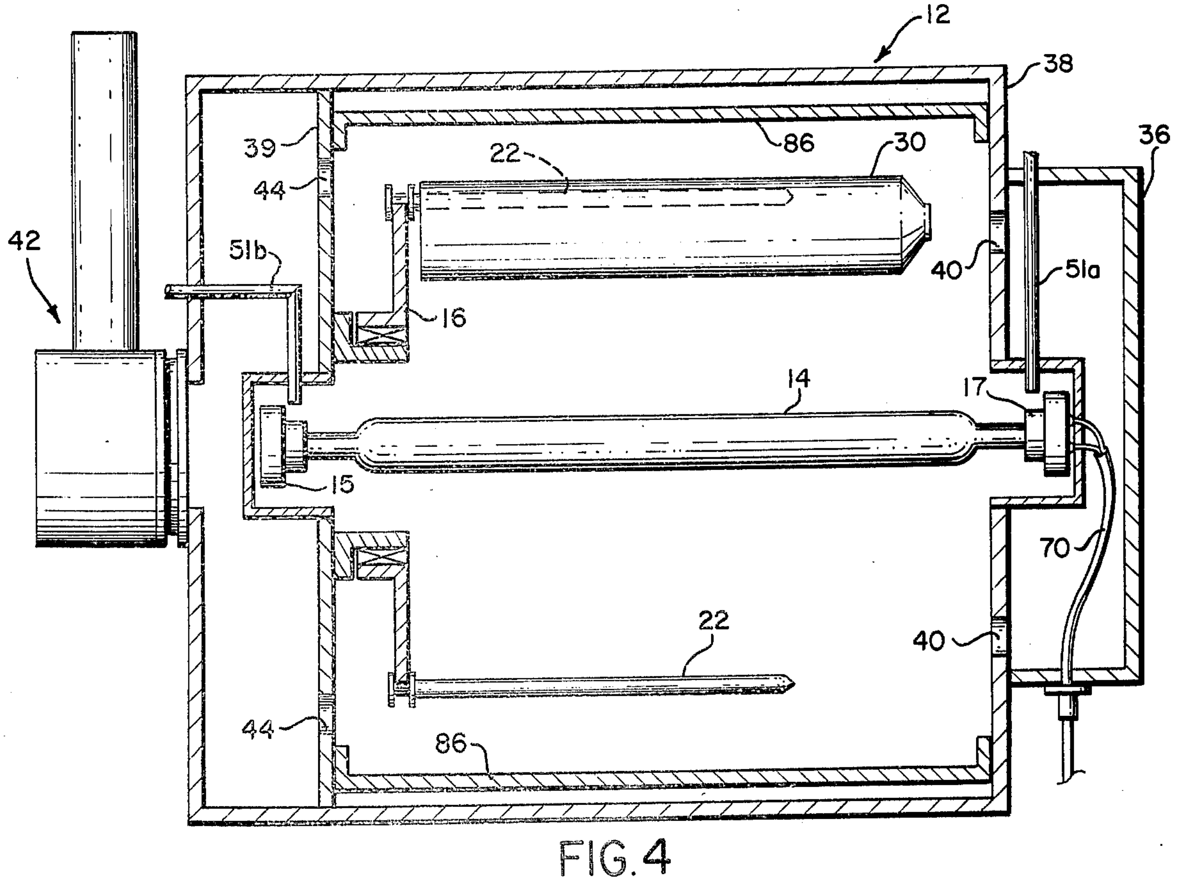
FIG. 4 is an enlarged elevation section view of the housing interior shown in FIG. 3.

FIG. 3 shows the alignment of tube 30*a* upon pin 22 with tube 30*b* already located on the pin and ready for movement into the housing 12. The endless conveyor is powered by a drive means (not shown) which may move the conveyor through engagement with a sprocket gear (also not shown). It is contemplated that the drive means would be variable speed to provide for varying the residence time within the housing, i.e., the amount of exposure of each tube to the U.V. radiation. Generally, residence times from 4–50 seconds have provided a suitable cure for photosensitized acrylic coatings having a thickness of from about 0.0002 to 0.0007 inches with the aforementioned 200 watt per inch Hanovia lamp. The tubes are revolved about the 200 watt lamp a radial distance of from about 3 to 15 inches. Of course, this distance will vary depending on the size, structure and wattage of the U.V. source.

It has been found desirable that the cooling means maintain a temperature of no higher than about 120° F within the housing. Use of the water-cooled quartz heat exchanger substantially increases the cooling capacity and allows an operator to stop the conveyor for several minutes with the radiation source activated without damage to the coating or tubular articles.

With the present invention, curing efficiency is greatly enhanced over the prior art heat curing ovens and narrow band U.V. curing devices. A complete cure may be effected in a matter of seconds with an apparatus that is very small in size and without the need for large amounts of valuable energy resources. Comparable heat curing systems take up large spaces and frequently require several minutes of residence times consuming large amounts of oil or gas fuel. Such systems also require large cooling devices for reducing the temperatures of the tubes after they have been heat cured.

While the invention has been described with respect to a preferred embodiment, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. A system for continuously curing resin coated articles comprising:

an elongated radiation source;

article transportation means comprising an endless conveyor having mounted means for aligning the longitudinal axis of said coated articles substantially parallel and coextensive with the longitudinal axis of said radiation source;

rotation means positioned concentric with the longitudinal axis of said radiation source for guiding said conveyor a predetermined distance radially outward from said source;

a housing enclosing said radiation source including inlet and outlet openings for said endless conveyor, said housing having cooling means for removing heat generated by said radiation source;

wherein said endless conveyor is provided with a plurality of stationary pins extending transversely therefrom; and, wherein said article transportation means includes at least two rotatable guide means mounted in alignment with said rotation means, said guide means spaced from each other a distance less than the diameter of said rotation means with said conveyor positioned between said guide means and about a major portion of the circumference of said rotation means.

2. The system of claim 1 including radiation reflector means positioned within said housing about said radiation source and radially outward from said rotation means and endless conveyor.

3. The system of claim 1 wherein said cooling means comprises a cooling air source in communication with said housing, said air source adapted to circulate cool air about the interior of the housing including vent means in said housing for the egress of said cool air.

4. The system of claim 3, wherein said cooling air source includes a fan mounted on a plenum chamber connected to said housing.

5. The system of claim 1 wherein said cooling means includes a heat exchanger adjacent said radiation source for removing heat emanating therefrom.

6. The system of claim 5 wherein said heat exchanger comprises a double-walled tubular-shaped quartz heat exchanger extending about said elongated radiation source and along the longitudinal extent thereof.

7. The system of claim 1 wherein said endless conveyor is a link chain and said rotation means is a sprocket wheel.

8. A method for curing resin coated articles comprising:

successively positioning resin coated articles upon stationary mounting means on an endless conveyor outside of a housing;

aligning said articles so that the longitudinal axis thereof is parallel and coextensive with the longitudinal axis of an elongated radiation source;

conveying said articles into the housing; and, revolving said articles about a curved pathway located concentric with the longitudinal axis of said radiation source and in a plane perpendicular to said axis;

simultaneously maintaining said articles stationary on said mounting means thereby exposing substantially the entire exterior surfaces of said articles to direct radiation from said radiation source;

curing said resin; and, conveying said articles outside the housing for removal from said mounting means.

9. The method of claim 8 including the step of removing excessive heat from about said articles while the articles are being exposed to said radiation.

* * * * *